United States Patent Office 3,476,136
Patented Nov. 4, 1969

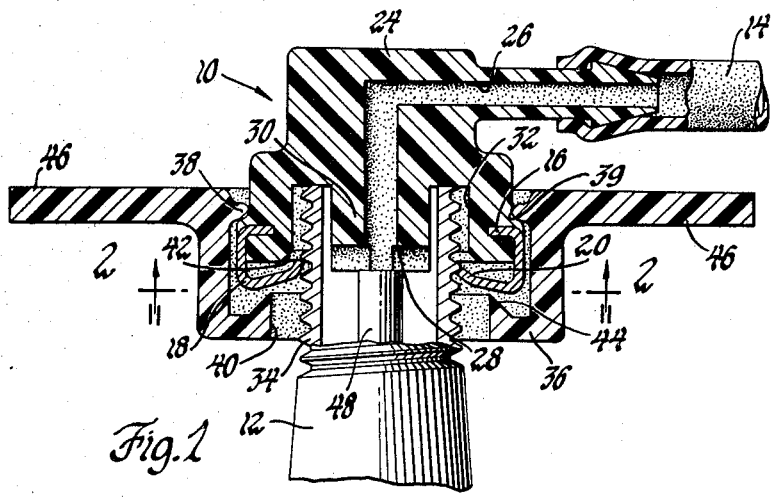

3,476,136
HOSE AND VALVE STEM CONNECTOR
Thomas W. Weisgerber, Saginaw, Mich., assignor to General Motors Corporation, Detroit, Mich., a corporation of Delaware
Filed Jan. 4, 1968, Ser. No. 695,630
Int. Cl. F16l 37/28; F16k 15/20
U.S. Cl. 137—231                7 Claims

ABSTRACT OF THE DISCLOSURE

A hose and tire valve stem connector having resilient fingers releasably engaging the threads of the stem as the sole means for holding the connector in its functional position and its parts being relatively movable in the direction of the stem axis for quickly engaging or releasing the connector from those threads and also simultaneously opening or closing the valve in the stem.

---

This invention relates to conduit connectors and more particularly to quick releasable connectors such as a connector for a hose and tire valve stem.

Conventionally, tire pump hoses are supplied with connectors adapted to be threaded onto tire valve stems to form a sealed conduit and simultaneously to displace a valve in the stem to its open position. Removal of such a connector from the stem permits the valve to close. This common threading and unthreading procedure is a slow and burdensome chore. Sometimes the threading operation is avoided by utilizing a rubbery connector which yields radially when applied forcefully to a stem and forms a seal with the stem threads. Such a connector must be held on the stem manually to prevent its being blown off thus leaving the operator at a disadvantage in manipulating a pump or performing some other step in the operation.

An object of the present invention is to provide an improved connector having a positive holding means for engaging a valve stem and which may be quickly engaged or disengaged with respect to a valve stem.

To this end, a feature of the present invention is a connector having coaxial parts, one of the coaxial parts being of spring steel and having inwardly directed tongues adapted to engage teeth of threads on a valve stem, a second of the coaxial parts being a coupling to a hose, and a third of the coaxial parts being retained on the second part for cooperative action to distort and release the one part upon relative motion being imparted to the second and third parts to unlock and lock the tongues with respect to the stem.

These and other features of the invention will now be described in detail in the specification and then pointed out more specifically in the appended claims.

In the drawings:

FIGURE 1 is a cross-sectional view of a connector presented as a preferred embodiment of the present invention and as mounted in its functional position on a valve stem;

FIGURE 2 is a sectional view looking in the direction of the arrows 2—2 in FIGURE 1;

FIGURE 3 is a view similar to that of FIGURE 1 but with the connector parts relatively positioned for free removal from the valve stem; and FIGURE 4 is an exploded view of the connector parts with sections broken away better to show the construction.

In FIGURE 1, the connector generally indicated at 10 is joined to a conventional valve stem 12 in such a way as to produce a sealed through passage between an air hose 14 and the stem 12. The connector 10 comprises three parts which are coaxially arranged. The first or an inner part is made up of a ring 16 of spring steel integral with an annular series of tongues 18 each of which is of V-shaped cross section as best seen in FIGURE 3 and the free ends 20 of these tongues extend inwardly toward the axis of the connector to serve as a holding means as will further appear. The ring 16 is embedded within the plastic material of the second part 24 of the connector 10. This second part defines a right angular small diameter passage 26 open for communication with the hose or conduit 14. The other end of the small passage 26 terminates in a transverse slot 28 formed in a projection 30 of the part 24 and surrounding this projection is an annular recess 32 which is freely receptive to the threaded end 34 of the valve stem 12. Surrounding the lower portion of the second part 24 and the first part or tongue ring 16 is a third part 36 of the connector 10. This part is retained on the second part 24 by an annular rib 38 formed on the third part 36 and an annular shoulder 39 on the second part 24. The third part 36 has an opening 40 which is larger than the recess 32. The margin of the recess 32 is chamfered slightly as at 42 to coact with the upwardly bent free ends of the tongues 18. A frusto-conical ramp 44 is formed on the third part 36 surrounding the opening 40 and this ramp is adapted to contact the under surfaces of the tongues 18. The third part 36 has diagonally opposite projections or arms 46 as best seen in FIGURE 4. The valve stem 12 encloses a valve pin 48 wider than the slot 28 and which, when depressed or pushed down within the stem 12, is adapted to open a passageway through the latter.

To apply the connector 10 to the valve stem 12, it is merely necessary to place the connector over and coaxial with the end of the stem 12 and push down on the second part 24. The tongues 18 will slide over the teeth 34 and firmly hold the end of the stem 12 tightly against the bottom of the recess 32 in the second part 24 to form a seal. The projection 30 on the second part 24 will engage and depress the valve pin 48 and open the valve. The connector 10 is then ready for the admission of fluid to the valve stem 12. For the removal of the connector 10 from the valve stem, it is merely necessary to press down on the upper face of the part 24 while pulling up on the projections 46 of the third part 36 and this will cause the ramp 44 to urge the tongues 18 outwardly and away from the threads 34. Separating the connector 10 from the stem 12 will permit the valve pin 48 to rise and, as will be seen in FIGURE 3, the connector may easily be lifted off from the stem with the chamfer 42 allowing leeway for the tongue ends to clear the threads as the rib 38 leaves the shoulder 39.

I claim:

1. A connector including coaxial parts defining a through passage, one of said parts being of spring steel and having inwardly directed tongues adapted to engage threads of a valve stem, a second of said parts being a coupling member for a hose, a third of said parts surrounding said first and second parts, and said second and third parts being relatively movable to distort said one part and move said tongues outwardly and away from the axis of said parts.

2. A connector as set forth in claim 1, said second and third parts being of plastic material.

3. A connector as set forth in claim 1, the said through passage being of small diameter in said second part and of large diameter in said third part, and said tongues extending inwardly and terminating within said large diameter.

4. A connector as set forth in claim 1, said first part being a ring and said tongues each being of V-shaped cross-section with one leg of each tongue having a free end extending toward said axis and second part, and the other leg of each tongue being radially positioned between said second and third parts.

5. A connector as set forth in claim 1, said third part having a ramp extending toward said second part and adapted to contact said tongues to release them from said threads when said second and third parts are moved relatively.

6. A connector as set forth in claim 1, said second part having an annular recess surrounding said through passage and receptive to said valve stem, said third part having an opening larger in diameter than said recess freely to receive said valve stem, and a portion of said second part defining a length of said through passage and adapted to extend into said valve stem for contacting a valve pin therein.

7. A connector including three parts having the same axis, one of said parts being a steel ring with an annular series of resilient tongues having legs extending inwardly, the second of said parts having a projection and also defining a small passage connectible to a conduit such as a hose, an annular recess in said part surrounding said small passage, and said projection, said annular recess being receptive to the open end of a threaded valve stem, said projection being adapted to extend into said stem, the third of said parts having an opening larger in diameter than said small passage and freely receptive to said valve stem, an annular frusto-conical ramp on said third part extending toward said series of tongues, the said axis and second part, and the arrangement being such that movement of said second and third parts relative to each other will cause said ramp to force said tongues outwardly and away from the said axis.

References Cited

UNITED STATES PATENTS

| 1,297,719 | 3/1919 | Myers | 285—35 |
| 1,797,383 | 3/1931 | Wahl | 137—231 |

HAROLD W. WEAKLEY, Primary Examiner

U.S. Cl. X.R.

85—33; 285—35, 257, 308